(12) United States Patent
Chikazawa et al.

(10) Patent No.: US 8,069,777 B2
(45) Date of Patent: Dec. 6, 2011

(54) FRYER

(75) Inventors: Hideo Chikazawa, Nagoya (JP);
Tsuneyasu Hayakawa, Nagoya (JP);
Hideki Kijimoto, Nagoya (JP)

(73) Assignee: Paloma Co., Ltd., Nagoya (JP)

( * ) Notice: Subject to any disclaimer, the term of this patent is extended or adjusted under 35 U.S.C. 154(b) by 606 days.

(21) Appl. No.: 12/208,008

(22) Filed: Sep. 10, 2008

(65) Prior Publication Data

US 2009/0084272 A1    Apr. 2, 2009

(30) Foreign Application Priority Data

Sep. 27, 2007  (JP) ................................. 2007-252096

(51) Int. Cl.
*A47J 37/12*  (2006.01)
*A47J 37/00*  (2006.01)
(52) U.S. Cl. .......................................... 99/403; 99/407
(58) Field of Classification Search ............... 99/330, 99/331, 403, 407, 404, 405, 406
See application file for complete search history.

(56) References Cited

U.S. PATENT DOCUMENTS

| 4,602,612 | A  | * | 7/1986  | Schwizer ................... 126/390.1 |
| 5,261,322 | A  | * | 11/1993 | Yokoyama et al. ............. 99/330 |
| 5,367,949 | A  | * | 11/1994 | Nitschke et al. ................ 99/334 |
| 5,887,509 | A  | * | 3/1999  | Russett ........................... 99/330 |
| 6,101,929 | A  | * | 8/2000  | Saito .............................. 99/403 |
| 6,269,808 | B1 | * | 8/2001  | Murahashi ................. 126/391.1 |
| 6,371,010 | B1 |   | 4/2002  | Chikazawa et al. |
| 6,443,051 | B1 | * | 9/2002  | Suzuki ............................ 99/330 |
| 2002/0038604 | A1 |   | 4/2002 | Chikazawa et al. |
| 2002/0104445 | A1 |   | 8/2002 | Suzuki |
| 2005/0223912 | A1 | * | 10/2005 | Kim et al. ....................... 99/476 |

FOREIGN PATENT DOCUMENTS

| JP | A-2002-085268 | 3/2002 |
| JP | A-2002-223953 | 8/2002 |

* cited by examiner

*Primary Examiner* — Reginald L Alexander
(74) *Attorney, Agent, or Firm* — Oliff & Berridge, PLC

(57) ABSTRACT

A fryer includes: a housing; an oil vat; a combusting and heating unit; an operational panel provided at a front face of the housing; and an exhaust pipe provided at a rear of the oil vat. A cooling path is defined at a rear of the operational panel in the housing. An external pipe is provided at a rear of the housing to surround the exhaust pipe and has an exhaust port of which the sectional opening area is narrowed at an upper end of the exhaust pipe. An air passage is defined by the housing and through which the cooling path and the external pipe are connected.

7 Claims, 2 Drawing Sheets

FIG. 1A
FIG. 1B
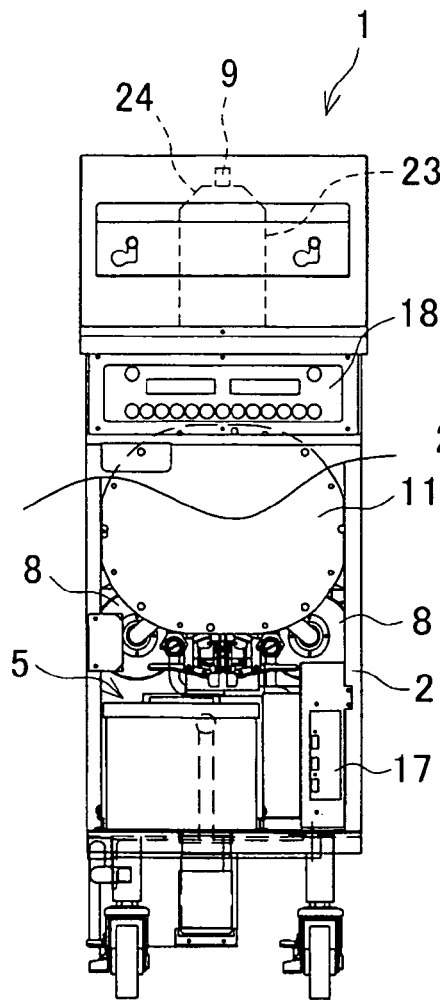
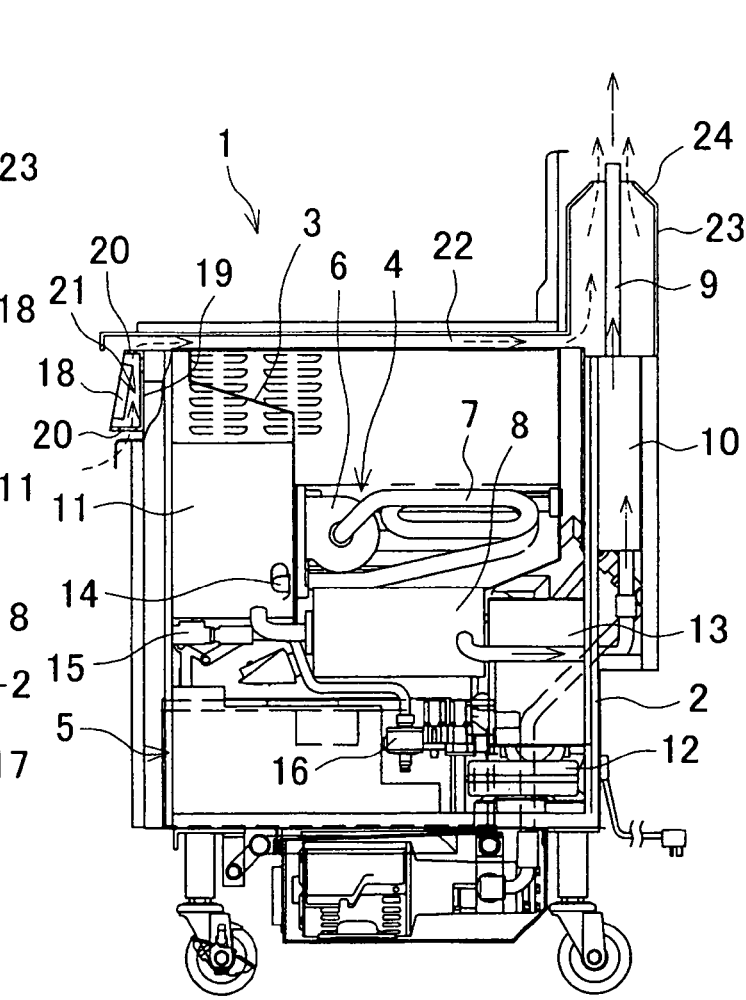

FRYER

CROSS-REFERENCE TO RELATED APPLICATIONS

This application is based upon and claims priority from Japanese Patent Application No. 2007-252096 filed on Sep. 27, 2007, the entire contents of which are incorporated herein by reference.

BACKGROUND OF THE INVENTION

1. Field of the Invention

The present invention relates to a fryer which heats oil stored in an oil vat with a combusting and heating unit such as a pulse burner, and puts foods into the oil vat thereby to cook the foods by heating.

2. Description of the Related Art

A fryer is describe in JP-A-2002-223953 and JP-A-2002-85268. Such a fryer includes an oil vat for storing cooking oil therein and a combusting and heating unit such as a pulse burner for heating the oil in this oil vat, which are provided at the upper portion in a housing. The oil in the oil vat is heated by the combusting and heating unit at a predetermined temperature before foods is put into the oil vat, whereby the foods can be cooked by heating. The fryer further includes a cooking controller (operational panel) provided at the front upper portion of the housing including operation buttons and a display portion for setting a cooking mode, a temperature keeping mode and a cooking temperature.

In such the fryer, as the temperature of the oil vat increases by heat-cooking, the temperature of the operational panel near the oil vat also increases and becomes easily high. Accordingly, when an operator operates the operational panel, the increase in temperature of the operational panel gives him discomfort, and may cause poor operation of the operational panel. Therefore, JP-A-2002-223953 describes providing a dedicated fan for cooling the operational panel, or locating the operational panel apart from the oil vat. However, the provision of the fan causes unnecessary increase of cost, and the installation of the operational panel apart from the oil vat causes inconvenience because the operational position becomes far from a cooker.

SUMMARY OF THE INVENTION

An object of the invention is to provide a fryer capable of suppressing effectively increase in temperature of an operational panel with simple structure in which increase of cost is small and without detriment to usability.

According to an aspect of the invention, there is provided a fryer comprising: a housing; an oil vat provided at the upper portion of a housing and configured to store oil; a combusting and heating unit provided at the upper portion of the housing and configured to heat the oil stored in the oil vat; an operational panel provided at a front face of the upper portion of the housing and operable to set operation of the combusting and heating unit; an exhaust pipe which is provided at a rear of the oil vat in the housing to protrudes upward and through which combustion exhaust gas from the combusting and heating unit is allowed to be exhausted; a cooling path which is defined at a rear of the operational panel in the housing and through which air is allowed to pass; an external pipe that is provided at a rear of the housing to surround the exhaust pipe and has an exhaust port of which the sectional opening area is narrowed at an upper end of the exhaust pipe; and an air passage which is defined by the housing and through which the cooling path and the external pipe are connected to form a flow of air by inhaling air into the external pipe from outside through the cooling path and the air passage following the exhaust of the combustion exhaust gas from the exhaust pipe and by exhausting the air from the outward exhaust port, thereby cooling the operational panel.

According to another aspect of the invention, there is provided a fryer which comprising: a housing; an oil vat provided at an upper portion of the housing and configured to store oil; a combusting and heating unit provided at the upper portion of the housing and configured to heat the oil stored in the oil vat; an air supply pipe provided at the upper portion of the housing and configured to supply combustion air to the combusting and heating unit by a fan; an operational panel provided at a front face of the upper portion of the housing and operable to set operation of the combusting and heating unit; a cooling path which is defined at a rear of the operational panel in the housing and through which air is allowed to pass; and an air passage which is formed in the housing and through which the fan and the cooling path are connected to form a flow of combustion air taken into the air supply pipe through the cooling path and the air passage, thereby cooling the operational panel.

BRIEF DESCRIPTION OF THE DRAWINGS

FIGS. 1A and 1B are explanatory views of a fryer according to a first embodiment, in which FIG. 1A shows a front view and FIG. 1B shows a side view.

DETAILED DESCRIPTION OF THE EMBODIMENTS

Figure 2:
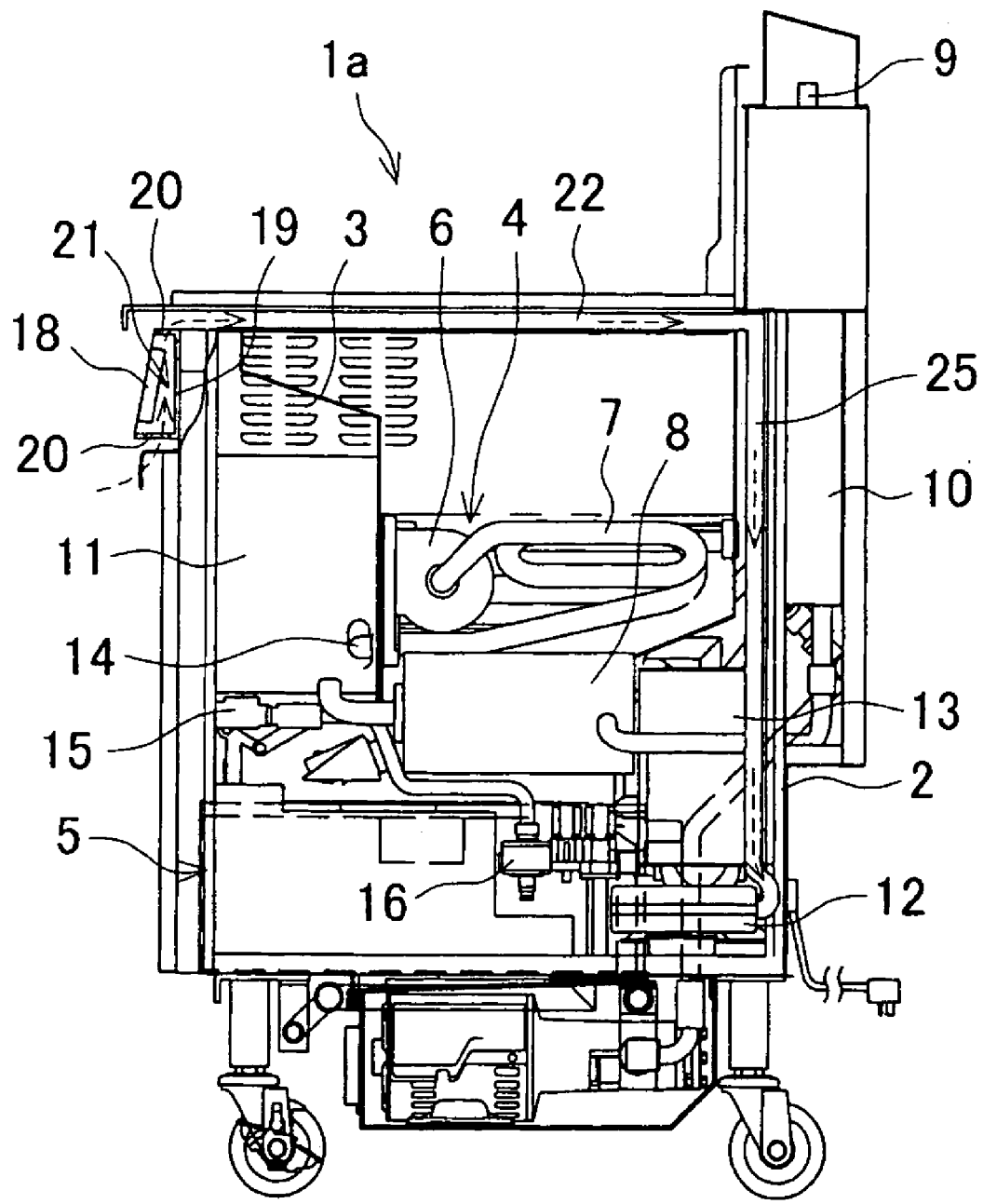
FIG. 2 is a side view of a fryer according to a second embodiment.

Embodiments of the invention will be described below with reference to drawings.

Embodiment 1

FIGS. 1A and 1B are explanatory views showing an example of a fryer, in which FIG. 1A shows a front view and FIG. 1B shows a side view. A fryer 1 includes, in a housing 2, an oil vat 3 filled with oil, a pulse burner 4 as a combusting and heating unit for heating the oil in this oil vat 3, and an oil cleaner 5 for filtering the oil. The pulse burner 4 includes a combustion exhaust system that includes: a combustion chamber 6 which is provided in the oil vat 3 and combusts mixed gas of fuel gas and combustion air; a tail pipe 7 through which combustion gas from the combustion chamber 6 passes; a de-coupler 8, 8 connected to the downstream side of the tail pipe 7 and provided on both sides of the oil vat 3; and an exhaust pipe 9 which is connected to the downstream side of the de-coupler 8, 8 and installed upright at the rear of the housing 2. Reference numeral 10 is a muffler provided midway of the exhaust pipe 9.

Reference numeral 11 is an air chamber provided at the outside on a front side of the oil vat 3, which installs a mixing chamber (not shown) therein that communicates with the combustion chamber 6, and to which the combustion air can be supplied from a fan 12 provided at the bottom of the housing 2 through a muffler 13 and an air supply pipe 14. Further, a gas conduit 15 connected to the mixing chamber in the air chamber 11 is provided with a local switch 16 including two electromagnetic valves for controlling opening and closing of a supply path of fuel gas to be supplied to the pulse burner 4 and a gas governor for adjusting gas pressure.

Further, at the lower portion on the front side of the housing 2, a burner controller 17 is provided. The electromagnetic valves of the local switch 16 and a temperature sensor (not shown) provided in the oil vat 3 are connected to this burner controller 17. The burner controller 17 closes and opens the electromagnetic valves of the local switch 16 based on the basis of a temperature detecting signal from the temperature sensor so as to keep the oil temperature in the oil vat 3 at a cooking temperature (for example, 180° C. to 182° C.) thereby to enable execution of ON/OFF control which performs intermittently the combustion of air-fuel mixture in the combustion chamber 6.

At the upper portion on the front side of the housing 2, a fry controller 18 is provided as an operational panel which includes operation buttons and a display portion. The fry controller 18 is operable to set a cooking mode, a temperature keeping mode and a cooking temperature and input instructions to the burner controller 17. This fry controller 18 is supported to be inclined upward in a front portion of a bracket 19. The bracket 19 is fixed on the front surface of the housing 2 and has the C-shape in side view. The bracket 19 has plural through-holes 20, 20 . . . at the upper and lower portions and the rear portion of the bracket 19. The through holes 20 are arranged side-by-side in the left and right direction and communicate the space at a rear of the fry controller 18 with the outside. The through-holes 20 form a cooling path 21 which enables ventilation at the rear of the fry controller 18.

Further, the housing 2 is formed and partitioned to have air passages 22, 22 extending in the front and rear directions and provided on the left and the right of the oil vat 3 and at the upper end in the housing 2, such that front portions of the air passages 22 communicate with the cooling path 21 of the bracket 19. On the other hand, at the rear of the housing 2, an external pipe 23 that surrounds the exhaust pipe 9 coaxially and has a tapered exhaust port 24 of which sectional opening area becomes gradually smaller near the upper end of the exhaust pipe 9 is provided upright. The lower end of this external pipe 23 communicates with the left and right air passages 22, 22 in the housing 2.

In the fryer 1, when the oil vat 3 is filled with oil, the predetermined cooking mode is selected by the fry controller 18, and an operation switch is tuned on, the burner controller 17 rotates the fan 12 for a predetermined time to supply air, and thereafter combusts intermittently the mixed gas in the combustion chamber 6 to operate the pulse burner 4. Namely, the pulse burner 4 operates repeatedly the operation of combusting intermittently the mixed gas in the combustion chamber 6 to exhaust forcedly the combustion exhaust gas by increase in pressure in the combustion chamber 6 which is caused by its combustion, and the operation of inhaling the fuel gas and the combustion air in the combustion chamber 6 which is put in the negative pressure state due to the exhaust of the combustion exhaust gas. By this ON/OFF operation of the pulse burner 4, the oil is heated to the cooking temperature and thereafter the cooking temperature is maintained. Accordingly, as soon as the foods are input into the oil vat 3 through a basket, they are heated and cooked by the oil of the high temperature.

When this pulse burner 4 operates, the combustion exhaust gas produced by the combustion in the combustion chamber 6 is exhausted by the internal pressure of the combustion chamber 6 from the tail pipe 7 to the de-coupler 8, and, exhausted from the exhaust pipe 9 upward as shown by an arrow of a solid line in FIGS. 1A and 1B. By a draft effect due to this rising of the combustion exhaust gas and by the negative pressure produced in the tapered exhaust port 24, flow of the air is produced in the housing 2, as shown by an arrow of dotted lines, which flows from the cooling path 21 of the bracket 19 through the air passages 22, rises in the external pipe 23, and is exhausted from the exhaust port 24. Since this flow of the air passes through the rear of the fry controller 18 in the bracket 19, the fry controller 18 is resultantly cooled from the rear surface.

Thus, according to the fryer 1 in the first embodiment, the cooling path 21 through which the air can pass is formed at the rear of the fry controller 18 in the housing 2, while the external pipe 23 is provided at the rear of the housing 2 which surrounds the exhaust pipe 9 and has the exhaust port 24 of which the sectional opening area is made gradually smaller toward the upper end of the exhaust pipe 9. The cooling path 21 and the external pipe 23 are connected through the air passages 22 formed in the housing 2 thereby to form the flow of air such that the air is inhaled into the external pipe 23 through the cooling path 21 and the air passages 22 following the exhaust of the combustion exhaust gas from the exhaust pipe 9, and the air is exhausted from the exhaust port 24. Accordingly, the fry controller 18 can be cooled. Hereby, the cooling fan is not required, and the increase in temperature of the fry controller 18 can be effectively suppressed with the simple structure which allows small increase in cost. Further, since the position of the fry controller 18 is as before, the usability is not impaired.

Particularly, in the first embodiment, the fry controller 18 is supported in the housing 2 through the bracket 19 having space at the rear of the fry controller 18, and the through-hole 20 for communicating the space with the outside is provided in the bracket 19 thereby to form the cooling path 21, whereby the cooling path 21 can be easily formed by means of the bracket 19.

Further, the pulse burner 4 is used as the combusting and heating unit. The pulse burner 4 combusts intermittently the mixed gas of the fuel gas and combustion air in the combustion chamber 6, exhausts forcedly the combustion exhaust gas due to the increase of the pressure in the combustion chamber 6 caused by the combustion, and inhales the fuel gas and the combustion air in the combustion chamber 6 which is put in the negative pressure state by the exhaust of the combustion exhaust gas. Therefore, there is provided a rational structure in which the ventilation in the cooling path 21 is possible by means of the exhaust operation of the combustion exhaust gas by the pulse burner 4.

Embodiment 2

Next, another embodiment of the invention will be described. The same components as those in the first embodiment are denoted by the same reference numerals and their repeated explanation is omitted.

In a fryer 1a shown in FIG. 2, left and right air passages 22 provided at the upper portion of a housing 2 are extended respectively through hoses 25 and connected to a fan 12. Namely, a cooling path 21 and air passages 22 are connected to an air supply system of a pulse burner 4.

Accordingly, as soon as an operation switch of a fry controller 18 is turned on, a burner controller 17 rotates the fan 12 for a predetermined time for purpose of air supply. Thereafter, the burner controller 17 operates the pulse burner 4 to execute ON/OFF control. At this time, by exhaust of combustion exhaust gas from a combustion chamber 6, the inside of the combustion chamber 6 is put in a negative pressure state. Therefore, fuel gas is taken into the combustion chamber 6, while the outside combustion air flows from the front of the housing 2, passes through the cooling path 21, the air passages 22, the hoses 25 and the fan 12, and is taken into the combustion chamber 6 through a muffler 13 and an air supply pipe 14. By this flow of combustion air, the fry controller 18 is resultantly cooled from its rear surface.

Thus, according to the fryer 1a in the above second embodiment, the cooling path 21 through which air can pass is formed at the rear of the fry controller 18 in the housing 2; the fan 12 and the cooling path 21 are connected through the air passages 22 formed in the housing 2; and the fry controller 18 can be cooled by the flow of combustion air taken into the air supply pipe 14 through the cooling path 21 and the air passages 22. Hereby, the cooling fan is not required, and the increase in temperature of the fry controller 18 can be effectively suppressed with the simple structure in which the increase in cost is small. Further, since the position of the fry controller 18 is as before, the usability is not impaired.

Further, also in this second embodiment, there is provided the rational structure in which the ventilation in the cooling path 21 is possible by means of the inhalation operation of the combustion air by the pulse burner 4.

In the above each embodiment, the cooling path is formed by the through-hole provided in the bracket. However, the concrete structure can be appropriately modified. For example, in case where the fry controller is directly attached to the front surface of the housing without the bracket, space or a groove communicating with the outside may be provided as a cooling path at the rear of the fry controller and on the front surface of the housing. Further, the location of the cooling path is not limited to the rear space of the fry controller, but the cooling path may be formed around the fry controller.

Further, the above each embodiment adopts the structure in which only one exhaust pipe is provided. However, in case that the plural exhaust pipes are provided, each of the exhaust pipes may be accommodated in respective one of external pipes having similarly an exhaust port, and air passages may be provided so as to accommodate with all the external pipes; or all the exhaust pipes may be accommodated in an external pipe having an oblong section, and an exhaust port of which the sectional opening area becomes gradually smaller near an opening of each exhaust pipe may be provided. Further, the shape of the exhaust port is not limited to the tapered form, but may be changed such that the exhaust port is obtained by plural recess portions formed intermittently in the circumferential direction. Further, a cylinder or a ring-shaped plate body which is another member from the external pipe and narrows a flowing path may be accommodated in the external pipe thereby to provide an exhaust port.

On the other hand, the design of the air passage may be appropriately changed such that the air passage uses the hose in the first embodiment or is formed by partitioning the space in the housing in the second embodiment.

Further, regarding the fryer side, the combusting and heating unit is not limited to the pulse burner but a gas burner may used as the combusting and heating unit. Further, the fryer is not limited to the type having a single oil vat, but may be a type having a pair of oil vats. In any case, the invention is applicable. Further, when a fryer takes forcedly the combustion air thereinto by means of a gas burner and with an air supply fan, the flow of air is formed in the cooling path and the air passage by the fan.

What is claimed is:

1. A fryer comprising:
   a housing;
   an oil vat provided at an upper portion of the housing and configured to store oil;
   a combusting and heating unit provided at the upper portion of the housing and configured to heat the oil stored in the oil vat;
   an air supply pipe provided at the upper portion of the housing and configured to supply combustion air to the combusting and heating unit by a fan;
   an operational panel provided at a front face of the upper portion of the housing and operable to set operation of the combusting and heating unit;
   an upper-side through-hole;
   a lower-side through-hole, which is positioned lower than the upper-side through-hole, and which communicates with an outside;
   a cooling path, which is defined between the upper-side through-hole and lower-side through-hole at a rear of the operational panel in the housing, and through which air is allowed to pass; and
   an air passage, which is formed in the housing and through which the fan and the cooling path are connected to form a flow of combustion air taken into the air supply pipe through the cooling path and the air passage, thereby cooling the operational panel.

2. The fryer according to claim 1,
   wherein the operational panel is supported the housing through a bracket that defines space at the rear of the operational panel,
   wherein the the upper-side through-hole is positioned at an upper end of the bracket, and
   wherein the lower-side through-hole is positioned at a lower end of the bracket.

3. The fryer according to claim 1,
   wherein the combusting and heating unit comprises a pulse burner, the pulse burner is configured to:
   intermittently combust mixed gas of fuel gas and combustion air in a combustion chamber;
   forcedly exhaust the combustion exhaust gas due to increase of the pressure in the combustion chamber caused by the combustion; and
   inhale the fuel gas and the combustion air in the combustion chamber brought into a negative pressure state caused by the exhaust of the combustion exhaust gas.

4. The fryer according to claim 1,
   wherein the air passage comprises a first passage defined by the housing and a second passage defined by a hose connecting the first passage with the fan.

5. A fryer comprising:
   a housing;
   an oil vat provided at an upper portion of the housing and configured to store oil;
   a combusting and heating unit provided at the upper portion of the housing and configured to heat the oil stored in the oil vat;
   an operational panel provided at a front face of the upper portion of the housing and operable to set operation of the combusting and heating unit;
   an exhaust pipe which is provided at a rear of the oil vat in the housing to protrude upward and through which combustion exhaust gas from the combusting and heating unit is allowed to be exhausted;
   a cooling path which is defined at a rear of the operational panel in the housing and through which air is allowed to pass;
   an external pipe that is provided at a rear of the housing to surround the exhaust pipe and has an exhaust port of which the sectional opening area is narrowed at an upper end of the exhaust pipe; and
   an air passage which is defined by the housing and through which the cooling path and the external pipe are connected to form a flow of air by inhaling air into the external pipe from outside through the cooling path and the air passage following the exhaust of the combustion exhaust gas from the exhaust pipe and by exhausting the air from the outward exhaust port, thereby cooling the operational panel.

6. The fryer according to claim 1, wherein the operational panel is supported relative to the housing through a bracket that defines space at the rear of the operational panel, and wherein the bracket has a through-hole that allows the space to communicate with an outside to form the cooling path.

7. The fryer according to claim 1, wherein the combusting and heating unit comprises a pulse burner, the pulse burner being configured to:

intermittently combust mixed gas of fuel gas and combustion air in a combustion chamber;

forcedly exhaust the combustion exhaust gas due to increase of the pressure in the combustion chamber caused by the combustion; and inhale the fuel gas and the combustion air in the combustion chamber in a negative pressure state caused by the exhaust of the combustion exhaust gas.

* * * * *